United States Patent
Kim et al.

(10) Patent No.: US 8,021,575 B2
(45) Date of Patent: Sep. 20, 2011

(54) METAL HYDROXY CARBONATE NANOPARTICLE COATED PHOSPHOR AND METHOD FOR PREPARING THE SAME

(75) Inventors: Young Sic Kim, Seoul (KR); Seoung Jae Im, Songpa-gu (KR); Kubota Shunichi, Seongnam-si (KR); Jae Ho Lee, Yongin-si (KR); Tae Gon Kim, Seoul (KR); Seok Hyun Nam, Seoul (KR); Dong Chin Lee, Cheonan-si (KR)

(73) Assignees: Samsung Electronics Co., Ltd. (KR); Samsung Corning Precision Glass Co. Ltd. (KR)

( * ) Notice: Subject to any disclaimer, the term of this patent is extended or adjusted under 35 U.S.C. 154(b) by 709 days.

(21) Appl. No.: 12/113,225

(22) Filed: May 1, 2008

(65) Prior Publication Data

US 2009/0050848 A1 Feb. 26, 2009

(30) Foreign Application Priority Data

Aug. 22, 2007 (KR) ........................ 10-2007-0084497

(51) Int. Cl.
*C09K 11/02* (2006.01)

(52) U.S. Cl. .................. 252/301.4 R; 428/403; 428/404; 313/419; 313/486; 427/215; 252/301.4 F; 252/301.4 P; 252/301.4 S; 252/301.4 H; 252/301.5; 252/301.6 R; 252/301.6 S; 252/301.6 P; 252/301.6 F

(58) Field of Classification Search . 252/301.4 R–301.4 H; 427/215; 428/403, 404; 313/419, 486
See application file for complete search history.

(56) References Cited

U.S. PATENT DOCUMENTS

| | | | | |
|---|---|---|---|---|
| 2,971,859 A | * | 2/1961 | Sisneros et al. | 427/64 |
| 6,080,485 A | * | 6/2000 | Wataya | 428/403 |
| 6,150,757 A | * | 11/2000 | Ronda et al. | 313/486 |

FOREIGN PATENT DOCUMENTS

| | | |
|---|---|---|
| JP | 2003-147350 | 5/2003 |
| KR | 10-2006-0088244 | 8/2006 |

* cited by examiner

*Primary Examiner* — C. Melissa Koslow
(74) *Attorney, Agent, or Firm* — Cantor Colburn LLP

(57) ABSTRACT

Disclosed herein are a metal hydroxy carbonate nanoparticle-coated phosphor and a preparation method thereof. The phosphor coated with metal hydroxy carbonate nanoparticles exhibit improved thermal stability and an increased luminance lifespan, when applied to display devices, e.g., PDPs and lamps.

14 Claims, 4 Drawing Sheets

METAL HYDROXY CARBONATE NANOPARTICLE COATED PHOSPHOR AND METHOD FOR PREPARING THE SAME

This application claims priority to Korean Patent Application No. 10-2007-084497, filed on Aug. 22, 2007, and all benefits accruing therefrom under under 35 U.S.C. §119, the contents of which in its entirety are incorporated herein by reference.

BACKGROUND

This disclosure relates to a metal hydroxy carbonate nanoparticle-coated phosphor and a method for preparing the phosphor. This disclosure further relates to a phosphor whose surface is coated with metal hydroxy carbonate nanoparticles, that is capable of maintaining a luminance for a long period of time when it is applied to a lamp, and a method for preparing the phosphor.

Luminescence is defined as a phenomenon in which a material absorbs an external energy to emit visible light. In a broad sense, a material causing this phenomenon is defined as a "phosphor". The phosphor is used in various displays including fluorescent lamps, cathode ray tubes (CRTs), light emitting diodes (LEDs), plasma display panels (PDPs), vacuum fluorescent displays (VFDs), field emission displays (FEDs), and electroluminescence displays (ELDs). In addition, the phosphor directly affects the efficiency of products using phosphors.

In view of phosphor lifespan, a number of studies directed to phosphor efficiency have been conducted in a variety of application fields.

Since the phosphor efficiency and lifespan directly affects the efficiency of products using phosphors, there is a continuous demand for phosphors capable of maintaining luminance for a long period of time and preparation methods of such phosphors.

For example, various approaches have been attempted to maintain luminance of phosphors in three-wavelength lamps employing a mixture of red, green and blue phosphors in a predetermined ratio and in fluorescent lamps utilized in a variety of lighting units. In particular, a green $BaMgAl_{10}O_{17}$:Eu,Mn phosphor is used to manufacture fluorescent films, such as plasma display panels (PDPs), owing to its suitable optical efficiencies and excellent color purity. In order to maintain the luminance of this phosphor, coating the phosphor with a desired material has been proposed. The $BaMgAl_{10}O_{17}$:Eu,Mn phosphor shows considerable deterioration in luminance due to internal structural instability, defects to the phosphor surface which results from permeation of a short wavelength of ultraviolet light (185 nm) upon application to lamps, and formation of mercury compounds (e.g., Hg—O) caused by permeation of mercury ions. Conventional methods to solve these problems are mostly associated with coating phosphors with metal oxide to inhibit formation of mercury compounds when the phosphors are applied to lamps. However, the conventional methods have problems in that it has been difficult to obtain uniformly coated particles, and the coating process involves a heating process that causes deterioration of initial luminance. Another problem associated with these methods is that coated particles may unexpectedly inhibit light-emission.

BRIEF SUMMARY OF THE INVENTION

Disclosed herein is a phosphor that has thermal stability upon application to display devices (e.g., lamps) and maintains luminance for a long period of time.

Disclosed herein too is a method for preparing a phosphor by coating metal hydroxy carbonate nanoparticles on the phosphor that causes no deterioration in initial luminance and is thus capable of realizing a reduction in preparation costs through a simplified process.

Exemplary embodiments of the present invention include a display device employing the phosphor.

In one embodiment, the invention provides a phosphor whose surface is coated with metal hydroxy carbonate nanoparticles.

In another embodiment, the invention provides a method for preparing a metal hydroxy carbonate nanoparticle-coated phosphor, the method comprising dissolving a metal precursor and urea ($NH_2CONH_2$) in a solvent to form a solution; dispersing a phosphor in the solution; adjusting pH of the solution to a desired level such that the metal maintains an ionic state; and heating the solution.

In another embodiment, the invention provides a display device comprising the phosphor according to the present invention.

BRIEF DESCRIPTION OF THE DRAWINGS

Exemplary embodiments will be more clearly understood from the following detailed description taken in conjunction with the accompanying drawings, in which.

DESCRIPTION OF THE PREFERRED EMBODIMENTS

Figure 1:
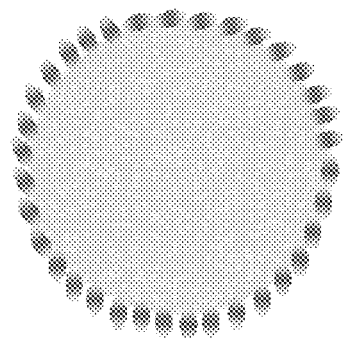
FIG. 1 is a schematic diagram illustrating an exemplary embodiment of a metal hydroxy carbonate nanoparticle-coated phosphor.

Exemplary embodiments will now be described in greater detail with reference to the accompanying drawings.

It will be understood that when an element is referred to as being "on" another element, it can be directly on the other element or intervening elements may be present therebetween. In contrast, when an element is referred to as being "disposed on" or "formed on" another element, the elements are understood to be in at least partial contact with each other, unless otherwise specified.

The terminology used herein is for the purpose of describing particular embodiments only and is not intended to be limiting of example embodiments. As used herein, the term "and/or" includes any and all combinations of one or more of the associated listed items. As used herein, the singular forms "a," "an" and "the" are intended to include the plural forms as well, unless the context clearly indicates otherwise. The term "or" means "and/or". The terms "comprises", "comprising", "having", "including", and "containing" are to be construed as open-ended terms (i.e., meaning including, but not limited to"). The use of the terms "first", "second", and the like do not imply any particular order, but are included to identify individual elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In one embodiment, the invention provides a phosphor whose surface is coated with metal hydroxy carbonate nanoparticles.

As detailed herein, by coating the phosphor with metal hydroxy carbonate nanoparticles, the phosphor can exhibit superior thermal, structural and physical stabilities, as compared to conventional phosphors. The adsorption of foreign materials is a main cause of luminance deterioration of phosphor. Without being bound to theory, it is believed that nanoscale uniform metal hydroxy carbonate particles coated on the phosphor surface inhibits adsorption of foreign materials (e.g., moisture and gas) on the surface. Further, coating the phosphor with metal hydroxy carbonate nanoparticles ensures steric stability against ultraviolet rays and mercury, and improves structural and physical stabilities, thus allowing the phosphor to maintain luminance for a long period of time.

In one embodiment, the invention provides a method of preparing phosphor coated with metal hydroxy carbonate nanoparticles comprises dissolving a metal precursor and urea ($NH_2CONH_2$) in a solvent to form a solution, dispersing a phosphor particle in the solution, adjusting the acidity of the solution to a desired level, and heating the resulting solution. In this method, a nucleus of metal hydroxy carbonate is formed directly on the phosphor surface through hydrolysis of urea, and then to develop the nucleus. The size of the coated particles can be controlled, by controlling the amount of metal precursor used. Accordingly, uniformly coated particles can be obtained by controlling the amount of metal precursor used.

The phosphor on which metal hydroxy carbonate nanoparticles are coated is not particularly limited. The phosphor may be of any type. Common phosphors used for fluorescent lamps and vacuum ultraviolet excitation can be used. Exemplary phosphors include, but are not limited to, $(Ba, Sr, Ca)_5(PO_4)_3Cl:Eu$, $BaMgAl_{10}O_{17}:Eu$, $Ba_5SiO_4,Sr_5(PO_4)_3Cl:Eu^{2+}$, $BaMg_2Al_{16}O_{27}:Eu^{2+}$, $ZnS:Ag$, $BaMgAl_{10}O_{17}:Eu,Mn (Eu)$, $(Sr, Ca, Ba, Mg)_{10}(PO_4)_6Cl_2:Eu$, $(Ba, Sr)_2SiO_4:Eu$, $Ca_8Mg(SiO_4)_4Cl:Eu,Mn$, $BaMgAl_{10}O_{17}:Eu,Mn$, $BaMg_2Al_{16}O_{27}:Eu,Mn$, $SrGa_2S_4:Eu$, $Ba_2SiO_4:Eu^{2+}$, $Ba_2MgSi_2O_7:Eu^{2+}$, $Ba_2ZnSi_2O_7:Eu^{2+}$; $BaAl_2O_4:Eu^{2+}$, $SrAl_2O_4:Eu^{2+}$, $(Ca, Sr)S:Eu^{2+}$, $CaLa_2S_4:Ce^{3+}$, $(Ca, Sr)S:Eu^{2+}$, $(Ba, Sr, Ca)MgP_2O_7:Eu^{2+}$, $Mn^{2+}$, and $MgO.CaF_2.GeO_2:Mn^{4+}$.

In one embodiment, the metal hydroxy carbonate nanoparticles coated on the phosphor surface may be formed of one or more compounds. For example, the metal of metal hydroxy carbonate nanoparticles may include at least metal hydroxy carbonate one selected from alkaline earth metals and rare earth metals. Suitable examples alkaline earth metals and rare earth metals include, but are not limited to, magnesium (Mg), calcium (Ca), strontium (Sr), barium (Ba), radium ($R^a$), scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The amount of the metal hydroxy carbonate nanoparticles coated on the phosphor surface is in a range of about 0.05 to about 15% by weight, with respect to the weight of the phosphor. When the amount is less than 0.05% by weight, the nanoparticles cannot sufficiently exert the intended phosphor luminance-maintaining function. On the other hand, when the amount exceeds 15% by weight, the particles cannot be uniformly coated on the phosphor surface and resulting in a final phosphor having a low initial luminance.

FIG. 1 is a schematic diagram illustrating a metal hydroxy carbonate nanoparticle-coated phosphor in accordance with exemplary embodiments. The shape of a metal hydroxy carbonate nanoparticle-coated phosphor is not particularly limited. As shown in FIG. 1, nanoparticles having a predetermined shape are intermittently distributed on the phosphor surface. Alternatively, the phosphor may be prepared in the form of a film according to the conditions of heating after coating.

In one embodiment, the nanoparticles have a size of about 10 nm to about 1 um, to about 50 nm to about 70 nm.

The use of the phosphor is not particularly restricted. In one embodiment, the phosphor coated with metal hydroxy carbonate nanoparticles may be widely utilized in a variety of display applications fields, e.g., fluorescent lamps, cathode ray tubes (CRTs), light emitting diodes (LEDs), plasma display panels (PDPs), vacuum fluorescent display (VFDs), field emission displays (FEDs) and electro luminescence displays (ELDs). For Example, the phosphor may be used for ultraviolet or vacuum ultraviolet ray excitation.

Hereinafter, a method for preparing the metal hydroxy carbonate nanoparticle-coated phosphor will be described.

In one embodiment, the method for preparing the phosphor comprises dissolving a metal precursor and urea ($NH_2CONH_2$) in a solvent to form a solution, dispersing a phosphor in the solution, adjusting pH of the solution to a desired level to allow the metal to maintain its ionic state, and heating the resulting solution. In the method, hydroxy carbonate nanoparticles are formed directly on the surface of the phosphor particles. That is, a nucleus of metal hydroxy carbonate nucleus is formed directly on the phosphor surface through hydrolysis of urea, and then to develop the nucleus. In the method, controlling the amount of metal precursor added can control the size of coated particles. Accordingly, uniformly coating particles can be obtained whose size is easily controllable.

Figure 2:
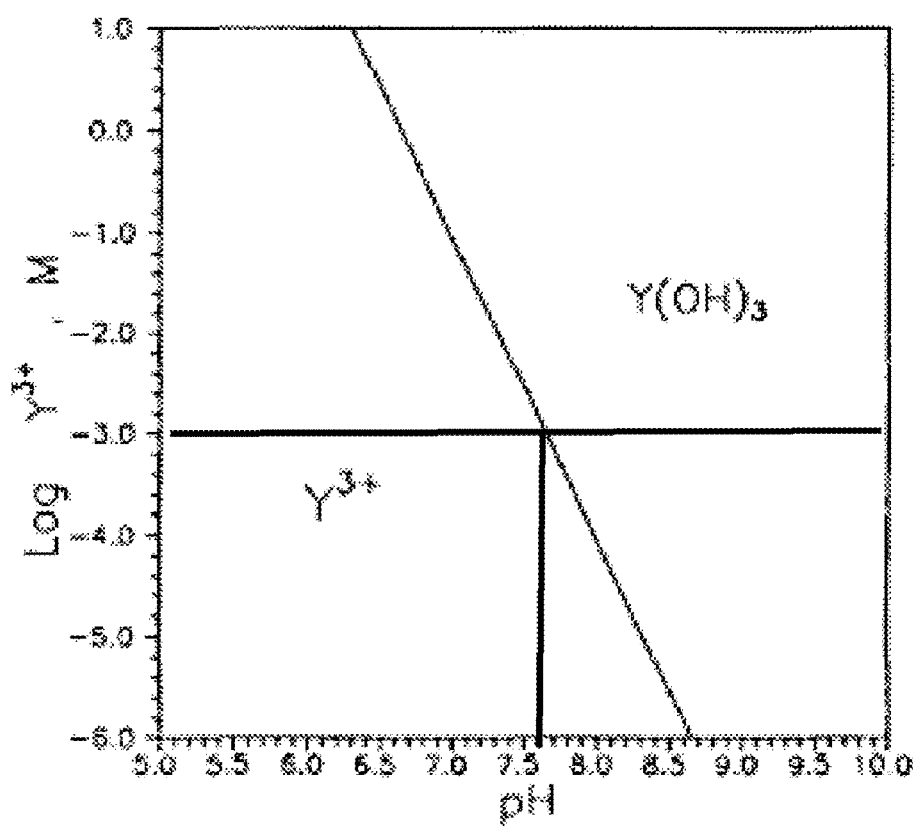
FIG. 2 is a graph showing the state of yttrium hydroxide at 25° C.

FIG. 2 is a graph showing the states of yttrium hydroxide at 25° C. In the case where $Y(NO)_3$ is used as the metal precursor, yttrium may exist in two states according to the concentration of yttrium trivalent ions ($Y^{3+}$) and pH. Referring to FIG. 2, when the concentration of $Y^{3+}$ ions is not more than $10^{-3}$ M, $Y^{3+}$ ions form no substantial $Y(OH)_3$ precipitate at a pH of not more than 7.6 and maintains its ionic state.

In one embodiment, the metal in the metal precursor is maintained in its ionic state by adjusting the metal concentration and the pH to a desired level, and thus, for example, yttrium is allowed to be reacted with urea ($NH_2CONH_2$) at an elevated reaction temperature. As a result, the urea is decomposed and then reacted with the $Y^{3+}$ ion to produce $Y(OH)CO_3$.

One conventional phosphor coating method employs bonding metal oxide particles onto phosphor particles with the use of a binder, and sintering to obtain metal oxide-coated phosphors. However, this method involves separate preparation of nanoparticles. Therefore, in order to obtain uniform nanoparticles, uniform nano-scale particles must be separately prepared in advance. In addition, this method involves the use of a binder to bind metal oxide and phosphors, thereby requiring a sintering process. Such a heating process causes deterioration in the initial luminance of phosphors.

In addition, a sol-gel process for coating a phosphor with metal oxide particles is being researched. The sol-gel process comprises forming metal oxide particles on the phosphor surface, followed by heating, to obtain crystalline metal oxide particles. But, this method also inevitably involves the heating process that disadvantageously causes deterioration in the initial luminance of phosphors.

In addition, a method for preparing phosphors by coating metal salts on phosphor surfaces reportedly allows the phosphors to maintain luminance due to steric effects upon application to fluorescent lamps. However, in the metal salt-coating method, it is difficult to realize luminance maintenance effects due to variation in electric surface charge characteristics of phosphors, and thus is difficult to obtain long-lifespan phosphors. Furthermore, the metal salt blocks UV light and thus causes deterioration in phosphor luminance.

Advantageously, the method according to the invention does not employ a separate step for preparing the coating particles, and therefore does not employ directly binding separately prepared coating particles with phosphors. In one embodiment, the invention adopts a method comprising directly forming a nucleus of metal hydroxy carbonate on the phosphor surfaces through hydrolysis of urea and then developing the nucleus directly on the phosphor. The method of this embodiment has advantages in that an overall process is simple and uniformly coated particles can be achieved, as compared to conventional coating methods.

Other advantages of the method are that bonding efficiency is considerably improved, as compared to the cases where metal oxide is directly bonded on phosphors. Thus, no sintering process is required and the deterioration in the initial luminance during coating can be avoided. Furthermore, size and shape of the coated particles can be readily controlled by controlling the amount of metal precursor added or by adjusting the pH.

The solvent that can be used in the method is not particularly restricted. Suitable solvents include, for example, water and organic solvents. Water is an exemplary solvent in view of convenience of handling. Alternatively, an organic solvent such as alcohol e.g., ethanol, or acetone, may be used.

The metal precursor used in the method includes at least one selected from alkaline earth metal precursors and rare earth metal precursors. Examples of the metal precursor include metal nitrate, metal chloride, metal acetate, metal sulfate and a combination thereof. Examples thereof include, but are not limited to, $Y(NO_3)_3$, $Y(Cl)_3$, $Y(CH_3COO)_3$, $Y_2(SO_4)_3$, $La(NO_3)_3$, $La(Cl)_3$, $La(CH_3COO)_3$, $La_2(SO_4)_3$, $Eu(NO_3)_3$, $Eu(Cl)_3$, $Eu(CH_3COO)_3$, $Eu_2(SO_4)_3$, $Mg(NO_3)_2$, $Mg(Cl)_2$, $Mg(CH_3COO)_2$, and $Mg(SO_4)$.

The phosphor that can be used in the method is not particularly restricted and may be of any type. For example, phosphors commonly used for fluorescent lamps and vacuum ultraviolet light excitation may be used. Exemplary phosphors include, but are not limited to, $(Ba, Sr, Ca)_5(PO_4)_3Cl$:Eu, $BaMgAl_{13}O_{17}$:Eu, $Ba_5SiO_4$, $Sr_5(PO_4)_3Cl$:$Eu^{2+}$, $BaMg_2Al_{16}O_{27}$:$Eu^{2+}$, ZnS:Ag, $BaMgAl_{10}O_{17}$:Eu,Mn(Eu), $(Sr, Ca, Ba, Mg)_{10}(PO_4)_6Cl_2$:Eu $(Ba, Sr)_2SiO_4$:Eu, $Ca_8Mg(SiO_4)_4Cl$:Eu,Mn, $BaMgAl_{10}O_{17}$:Eu,Mn, $BaMg_2Al_{16}O_{27}$:Eu,Mn, $SrGa_2S_4$:Eu, $Ba_2SiO_4$:$Eu^{2+}$, $Ba_2MgSi_2O_7$:$Eu^{2+}$, $Ba_2ZnSi_2O_7$:$Eu^{2+}$; $BaAl_2O_4$:$Eu^{2+}$, $SrAl_2O_4$:$Eu^{2+}$, $(Ca,Sr)S$:$Eu^{2+}$; $CaLa_2S_4$:$Ce^{3+}$, $(Ca, Sr)S$:$Eu^{2+}$; $(Ba, Sr, Ca)MgP_2O_7$:$Eu^{2+},Mn^{2+}$, and $MgO.CaF_2.GeO_2$:$Mn^{4+}$.

The pH of the solution is determined within a range allowing a given metal to remain in an ionic state. Generally, when trivalent metal ions are used, pH is in the range of about 2 to about 9.

The heating of the pH-adjusted solution to allow metal hydroxy carbonate nanoparticles to be formed on the phosphor surface is carried out at above about 80° C., at about 85° C. to about 95° C., at about 90° C. to about 92° C. The heating is carried out for about 40 to about 60 min.

The amount of the metal hydroxy carbonate nanoparticles coated on the phosphor is in a range of about 0.05 to about 15% by weight, with respect to the weight of the phosphor. When the amount is less than about 0.05% by weight, the nanoparticles cannot sufficiently exert the phosphor luminance-maintaining function. On the other hand, when the amount exceeds about 15% by weight, the particles cannot be uniformly coated on the phosphor and a final phosphor may have a low initial luminance.

In another embodiment, the invention provides a display device comprising the phosphor coated with metal hydroxy carbonate nanoparticles. Examples of the display device include, but are not limited to, fluorescent lamps, cathode ray tubes (CRTs), light emitting diodes (LEDs), plasma display panels (PDPs), vacuum fluorescent displays (VFDs), field emission displays (FEDs), and electro luminescence displays (ELDs). In one embodiment, the invention provides cold cathode fluorescence lamps (CCFLs) comprising the phosphor coated with metal hydroxy carbonate nanoparticles. Such a CCFL has a structure in which a fluorescent material is applied inside of a glass tube, two electrodes are sealed at opposite ends of the glass tube respectively, and an amount of a mixed gas consisting of mercury, argon and neon is filled inside the glass tube. Electrodes at opposite ends of the glass tube apply a high-voltage electric field inducing a discharge of electrons. When the electrons initiate to discharge, the mercury is excited to emit ultraviolet light. The ultraviolet light collides with phosphor particles present on the wall of the glass tube to emit visible light. Such visible light may be utilized in backlight units of liquid crystal display devices, faxes, scanners, copying machines, flat panel displays, and light sources for decorative or advertising elements.

The metal hydroxy carbonate nanoparticles coated on phosphor surfaces exhibit superior adherence, as compared to general metal oxides coated on phosphor surfaces. The metal hydroxy carbonate nanoparticles prevent separation of coating particles from phosphors during preparation of a slurry for fluorescent material application in the process for producing CCFLs, thereby maintaining the slurry viscosity to a desired level and thus securing stable physical properties of the phosphor. The metal hydroxy carbonate nanoparticle-coated phosphor exhibits superior flowability and is thus advantageously suitable for application to long type lamps. The metal hydroxy carbonate nanoparticles coated are partially or wholly converted into crystalline metal oxide through a sintering process during lamp production, ensuring steric stability against UV light and mercury via surface coating of particles and electrical stability through variation in electric surface charge of phosphors.

The phosphor coated with metal hydroxy carbonate nanoparticles may be used in external electrode fluorescent lamps (EEFLs), flat fluorescent lamps (FFLs), and the like, in addition to cold cathode fluorescence lamps (CCFLs).

The present invention will now be described in further detail with reference to the following examples. These examples are for illustrative purposes only and are not intended to limit the scope of the present invention.

EXAMPLES

Example 1

For this example, 0.22 g (7 wt %) of yttrium nitrate and 60 g of urea were dissolved in 100 mL of distilled water and 10 g of $BaMgAl_{10}O_{17}$:Eu,Mn was added thereto with stirring. The resulting solution was thoroughly stirred for 5 min and the solution was adjusted to pH 5-6 with the use of nitric acid and an amine-based base. The solution was heated at 90° C., stirred for 40 min, filtered and washed with distilled water three times. The phosphor thus obtained was dried in an oven at 60° C. for 3 hours.

Example 2

For this example, 0.52 g (3.5 wt %) of yttrium nitrate and 60 g of urea were dissolved in 100 mL of distilled water and 10 g of $BaMgAl_{10}O_{17}$:Eu,Mn was added thereto while stirring. A phosphor was prepared from the resulting solution in the same manner as in Example 1.

Example 3

For this example, 3.04 g (0.5 wt %) of yttrium nitrate and 60 g of urea were dissolved in 100 mL of distilled water and 10 g of $BaMgAl_{10}O_{17}$:Eu,Mn was added thereto while stirring. A phosphor was prepared from the resulting solution in the same manner as in Example 1.

Example 4

For this example, 6.08 g (14 wt %) of yttrium nitrate and 60 g of urea were dissolved in 100 mL of distilled water and 10 g of $BaMgAl_{10}O_{17}$:Eu,Mn was added thereto while stirring. A phosphor was prepared from the resulting solution in the same manner as in Example 1.

Comparative Example 1

For this comparative example, a phosphor was prepared from the solution in the same manner as in Example 1, except that no coating was formed on the surface.

Comparative Example 2

For this comparative example 3.04 g (7 wt %) of yttrium nitrate was dissolved in 100 mL of distilled water and 10 g of $BaMgAl_{10}O_{17}$:Eu,Mn was added thereto with stirring. The resulting solution was thoroughly stirred for 5 min and was adjusted to pH 10-11 with addition of an aqueous ammonia solution. The solution was stirred for 40 min, filtered and washed with distilled water three times. The phosphor thus obtained was dried in an oven at 60° C. for 3 hours and sintered at 600° C. for 1 hour to prepare an yttrium oxide-coated phosphor.

Experimental Example 1

Dispersion Stability

For this example, the zeta potential (mW) of the phosphors prepared in Examples 1 to 4 and Comparative Examples 1 and 2 was determined with a zeta potential meter (at pH=8). The results are shown Table 1 below.

TABLE 1

| Example No. | Zeta potential (mV) |
| --- | --- |
| Comp. Ex. 1 | 13 |
| Comp. Ex. 2 | 18 |
| Ex. 1 | 23 |
| Ex. 2 | 19 |
| Ex. 3 | 17 |
| Ex. 4 | 25 |

Experimental Example 2

Variation in Initial Luminance after Coating

For this example, the variation in initial luminance after coating of the phosphors prepared in Examples 1 to 4 and Comparative Example 2 was determined. The results are shown Table 2 below.

TABLE 2

| Example No. | Concentration of yttrium coated (wt %) | Initial Luminance (%) | Luminance after coating (%) | Decrease in luminance (%) |
| --- | --- | --- | --- | --- |
| Comp. Ex. 2 | 10 | 100 | 75 | −25 |
| Ex. 1 | 7 | 100 | 101 | 1 |
| Ex. 2 | 3.5 | 100 | 104 | 4 |
| Ex. 3 | 0.5 | 100 | 100 | 0 |
| Ex. 4 | 14 | 100 | 88 | −12 |

Experimental Example 3

Heat Deterioration Resistance

For this comparative example, the phosphors prepared in Examples 1 to 4 and Comparative Examples 1 and 2 were heated at 610° C. for 10 min and variation in luminance thereof was evaluated with respect to their thermal deterioration. The results are shown in Table 3 below.

TABLE 3

| Example No. | Concentration of yttrium coated (wt %) | Initial Luminance (%) | Luminance after coating (%) | Decrease in luminance (%) |
| --- | --- | --- | --- | --- |
| Comp. Ex. 1 | 0 | 100 | 93 | −7 |
| Comp. Ex. 2 | 10 | 75 | 70 | −5 |
| Ex. 1 | 7 | 101 | 98 | −3 |
| Ex. 2 | 3.5 | 104 | 101 | −3 |
| Ex. 3 | 0.5 | 100 | 96 | −4 |
| Ex. 4 | 14 | 88 | 83 | −5 |

Experimental Example 4

Lifespan Maintenance Ratio

Figure 3:
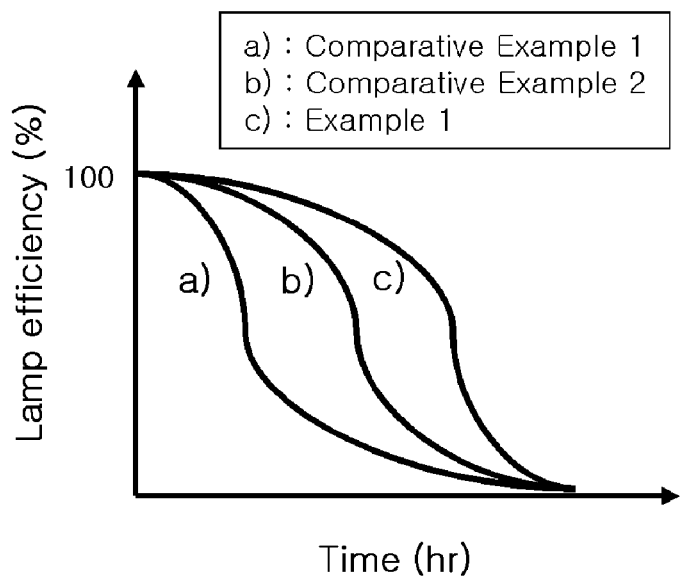
FIG. 3 is a graph showing variation in luminance as a function of time for the phosphors detailed in the Examples and Comparative Examples.

For this comparative example, the variation in luminance as a function of time of the phosphors prepared in Examples 1 and Comparative Examples 1 and 2 was measured and evaluated. The results are shown in FIG. 3. FIG. 3 demonstrates the luminance as a function of time of the phosphors prepared in Examples 1 and Comparative Examples 1 and 2. From FIG. 3, it can be seen that the metal hydroxy carbonate particle-coated phosphors show an increased lifespan.

It can be seen from the results of Examples and comparative Examples that the phosphor coated with metal hydroxyl carbonate particles exhibits physical and structural stabilities, as compared to phosphors, where no metal hydroxy carbonate particle is coated, and to metal oxide-coated phosphors.

A zeta potential represents an electric surface charge of a shear plane. In the case of particulates or colloids, as the absolute value of zeta potential increases, a repulsive force between particles is strengthened, thus resulting in an improvement in stability of the particles. On the other hand, when the zeta potential is nearly zero, the particles tend to aggregate with one another. Thus, the data set forth in Table 1 demonstrate that the phosphors of the Examples show superior stability compared to the phosphors of the Comparative Examples. As apparent from Table 2, in view of variation in initial luminance after coating, metal hydroxy carbonate particle-coated phosphors of Examples 1 to 4 show slight variation in zeta potential, as compared to metal oxide particle-coated phosphors.

In terms of thermal deterioration, the metal hydroxy carbonate particle-coated phosphors exhibit superior thermal stability and high luminance, as compared to the metal oxide particle-coated phosphor of Comparative Example 2. In addition, when metal hydroxy carbonate nanoparticles are applied to lamps, they are partially converted into metal oxides and thus can be uniformly coated on the lamps through a simple and efficient process, as compared to the case where metal oxide is directly coated on the phosphor surface.

Figure 4:
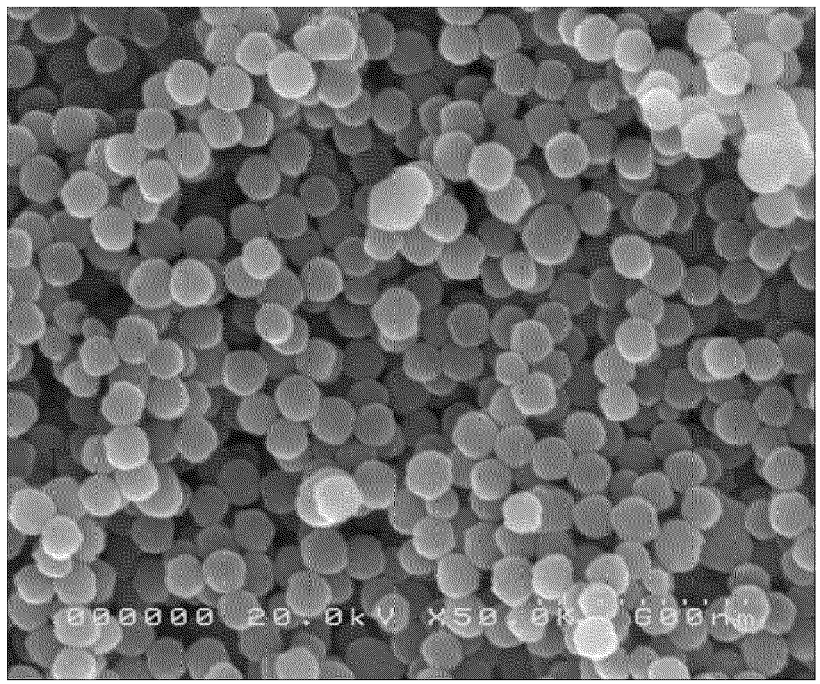
FIG. 4 is a scanning electron micrograph (SEM) image of an exemplary embodiment of an yttrium hydroxy carbonate nanoparticles.
Figure 5:
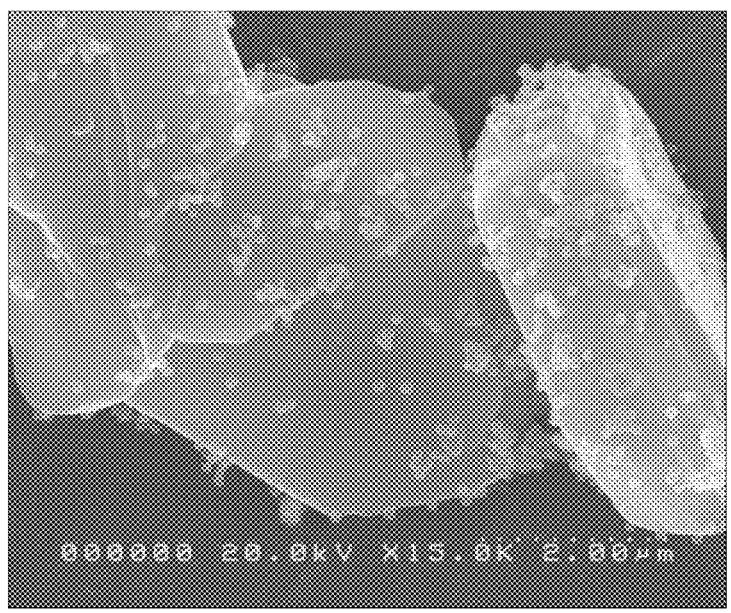
FIG. 5 is a scanning electron micrograph (SEM) image of an exemplary embodiment of an yttrium hydroxy carbonate nanoparticle-coated green BAM phosphor.
Figure 6:
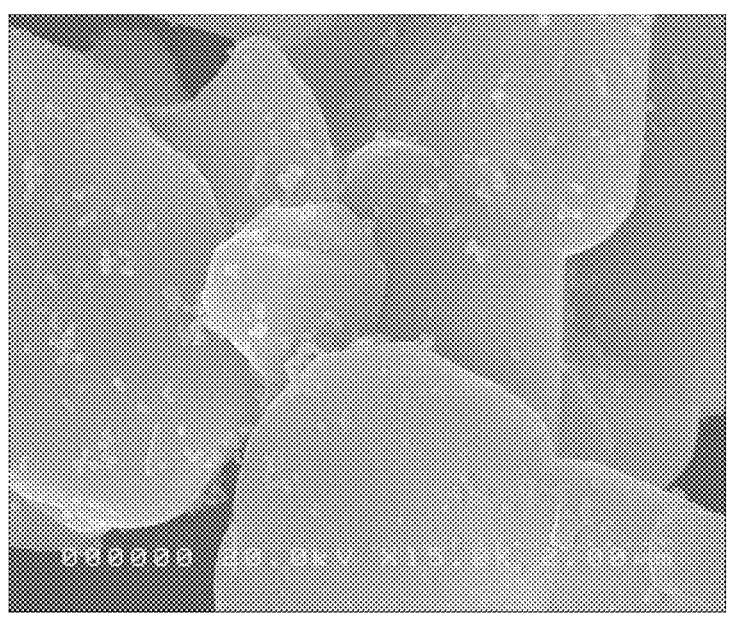
FIG. 6 is a scanning electron micrograph (SEM) image of an exemplary embodiment of an yttrium hydroxy carbonate nanoparticle-coated green BAM phosphor after sintering and coating yttrium oxide thereon.

FIG. 4 is a scanning electron micrograph (SEM) image of yttrium hydroxy carbonate nanoparticles prepared in Example 3. FIG. 5 is a SEM image of a yttrium hydroxy carbonate nanoparticle-coated green BAM phosphor obtained in Example 3. FIG. 6 is a SEM image of a green BAM phosphor coated with the yttrium hydroxy carbonate nanoparticles, sintered and then coated with yttrium oxide obtained in Example 3 and applied to lamps. From FIG. 4, it can be seen that uniform yttrium oxide hydroxy carbonate nanoparticles are obtained. From FIG. 5, it can be seen that nano-scale yttrium oxide hydroxy carbonate particles are evenly coated on the phosphor surface. FIG. 6 shows a phosphor applied to lamps and indicates that the coated particles are still uniformly distributed even after sintering the phosphor.

Figure 7:
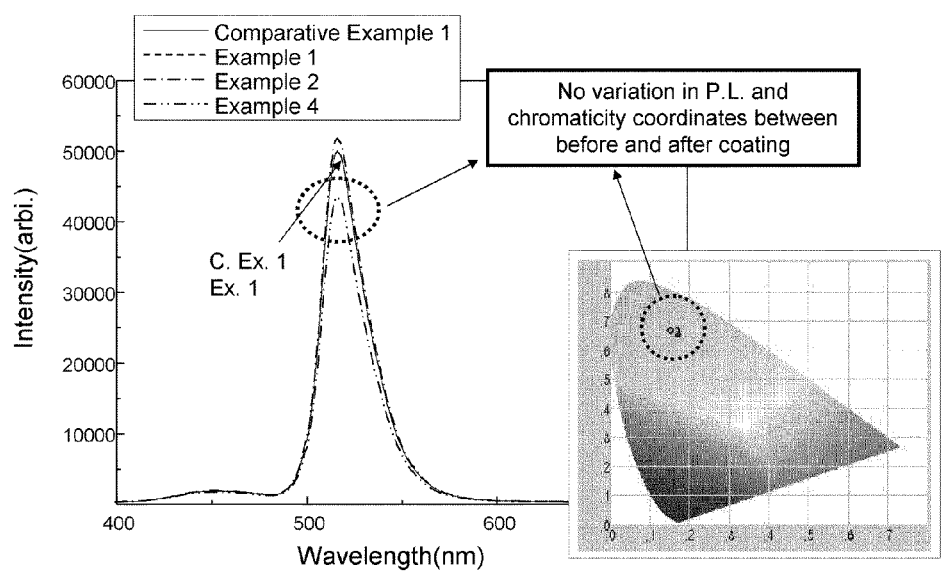
FIG. 7 is a graph showing variation in intensity as a function of wavelength and chromaticity coordinates of yttrium hydroxy carbonate nanoparticle-coated green BAM phosphor. As used herein, the term "P.L." means "Photoluminescence".

FIG. 7 is a graph showing variation in intensity as a function of wavelength as well as chromaticity coordinates of yttrium oxide hydroxy carbonate nanoparticle-coated green BAM phosphors obtained in Comparative Example 1 and Examples 1, 2 and 4. As can be seen from FIG. 7, even after coating yttrium hydroxy carbonate nanoparticles on the phosphor, the phosphor maintains inherent luminescent properties.

As described above, the metal hydroxy carbonate nanoparticle-coated phosphor inhibits adsorption of foreign materials (e.g., moisture and gas) on the phosphor surface. The metal hydroxyl carbonate nanoparticles are used in small amounts (0.05 wt %-15 wt %) to maintain a luminance for a long period of time when phosphor is applied to a lamp, thus a few nanoparticles are coated on the surface. Without being bound by theory, the coated nanoparticles on the surface give the surface of the phosphor 'electrical stability', and inhibits adsorption of foreign materials (e.g., moisture and gas) on the phosphor surface. Thus, an improvement in structural stability of the phosphor and a reduction in luminance deterioration over time can be achieved upon application of the metal hydroxy carbonate nanoparticle-coated phosphor to display devices, e.g., lamps, thereby realizing long-lifespan phosphors. The phosphor exhibits good adherence efficiency of coating materials thereon and excellent dispersability, thus improving physical properties of the phosphor upon application to lamps. In addition, the method for preparing a phosphor by coating metal hydroxy carbonate nanoparticles on the phosphor causes no significant deterioration in initial luminance and is thus capable of realizing reduced costs through a simplified process.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A phosphor whose surface is coated with metal hydroxy carbonate nanoparticles, wherein the metal hydroxy carbonate nanoparticles comprise at least one selected from alkaline earth metals and rare earth metals.

2. The phosphor according to claim 1, wherein the amount of the metal hydroxy carbonate nanoparticles coated on the surface of phosphor is about 0.05 to about 15% by weight, with respect to the weight of the phosphor.

3. The phosphor according to claim 1, wherein the metal hydroxy carbonate nanoparticles have a size of about 10 nm to about 1 um.

4. The phosphor according to claim 1, wherein the phosphor is a phosphor for ultraviolet or vacuum ultraviolet ray excitation.

5. A method for preparing a metal hydroxy carbonate nanoparticle-coated phosphor:
dissolving a metal precursor and urea ($NH_2CONH_2$) in a solvent to form a solution, wherein the metal precursor comprises at least one selected from the group consisting of $Y(NO_3)_3$, $Y(Cl)_3$, $Y(CH_3COO)_3$, $Y_2(SO_4)_3$, $La(NO_3)_3$, $La(Cl)_3$, $La(CH_3COO)_3$, $La_2(SO_4)_3$, $Eu(NO_3)_3$, $Eu(Cl)_3$, $Eu(CH_3COO)_3$, $Eu_2(SO_4)_3$, $Mg(NO_3)_2$, $Mg(Cl)_2$, $Mg(CH_3COO)_2$, and $MgSO_4$);
dispersing a phosphor in the solution;
adjusting pH of the solution to a desired level such that the metal maintains an ionic state; and
heating the solution.

6. The method according to claim 5, wherein the solvent is water or an organic solvent.

7. The method according to claim 5, wherein the metal precursor comprises at least one selected from the group consisting of metal nitrate, metal chloride, metal acetate and metal sulfate.

8. The method according to claim 5, wherein the solution is adjusted to a range of pH 2-9.

9. The method according to claim 5, wherein the heating is carried out at above about 80° C. for about 40 to about 60 min.

10. The method according to claim 5, wherein the amount of the metal hydroxy carbonate nanoparticles coated on the surface of the phosphor is about 0.05 to about 15% by weight, with respect to the weight of the phosphor.

11. The method according to claim 5, wherein the phosphor is a phosphor for ultraviolet or vacuum ultraviolet ray excitation.

12. A display device comprising a phosphor whose surface is coated with metal hydroxy carbonate nanoparticles, wherein the display device is a cold cathode fluorescence lamp (CCFL).

13. The display device according to claim 12, wherein the metal hydroxy carbonate nanoparticles comprise at least one selected from alkaline earth metals and rare earth metals.

14. The display device according to claim 12, wherein the amount of the metal hydroxy carbonate nanoparticles coated on the surface of the phosphor is about 0.05 to about 15% by weight, with respect to the weight of the phosphor.

* * * * *